US012761140B2

(12) United States Patent
Yamauchi et al.

(10) Patent No.: US 12,761,140 B2
(45) Date of Patent: Oct. 13, 2026

(54) MEASURING DEVICE AND RECORDING MEDIUM UTILIZING A POLARIZED LIGHT PHASE DIFFERENCE TO OBTAIN A STRESS DISTRIBUTION

(71) Applicant: Mitsubishi Electric Corporation, Tokyo (JP)

(72) Inventors: Takanori Yamauchi, Tokyo (JP); Hiroki Goto, Tokyo (JP); Yukari Miyagi, Tokyo (JP); Yoshiaki Konishi, Tokyo (JP); Junya Nishioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 18/679,163

(22) Filed: May 30, 2024

(65) Prior Publication Data

US 2024/0319077 A1 Sep. 26, 2024

Related U.S. Application Data

(63) Continuation of application No. PCT/JP2022/000616, filed on Jan. 12, 2022.

(51) Int. Cl.

| | |
|---|---|
| ***G01N 21/23*** | (2006.01) |
| ***G01L 1/24*** | (2006.01) |
| ***G01N 21/17*** | (2006.01) |

(52) U.S. Cl.

CPC ................ *G01N 21/23* (2013.01); *G01L 1/24* (2013.01); *G01L 1/241* (2013.01); *G01N 21/17* (2013.01)

(58) Field of Classification Search

CPC .......... G01N 21/23; G01N 21/17; G01L 1/24; G01L 1/241

See application file for complete search history.

(56) References Cited

U.S. PATENT DOCUMENTS

| | | | | |
|---|---|---|---|---|
| 5,396,328 A * | 3/1995 | Jestel | ................. | G01B 9/02028 356/482 |
| 9,709,379 B2 * | 7/2017 | Kemp | ................ | G01B 9/02004 |

(Continued)

FOREIGN PATENT DOCUMENTS

| | | |
|---|---|---|
| JP | 10-153500 A | 6/1998 |
| JP | 6707258 B2 | 6/2020 |
| WO | WO 2016/027874 A1 | 2/2016 |

OTHER PUBLICATIONS

International Search Report for PCT/JP2022/000616 mailed on Mar. 22, 2022.

(Continued)

*Primary Examiner* — Tarifur R Chowdhury
*Assistant Examiner* — Joshua M Carlson
(74) *Attorney, Agent, or Firm* — Birch, Stewart, Kolasch & Birch, LLP

(57) ABSTRACT

Included are: an interference unit that combines reference light with reflected light from a measurement object, separates the combined light into two orthogonal beams of polarized light, converts the two beams of polarized light into two analog electrical signals, and outputs the two analog electrical signals; an analog-to-digital converting unit that converts the two analog signals into digital electrical signals and outputs the digital electrical signals as two digital signals; and a calculation processing unit that converts the digital electrical signals corresponding to the two beams of polarized light into frequency spectra for each of beams of light emitted from an light emitting unit, calculates an optical path length difference between the reference light and the measurement light, obtains a polarized light phase difference between the two beams of polarized light for each of the beams of light, and obtains wavelength dependency of the polarized light phase difference.

6 Claims, 7 Drawing Sheets

(56) References Cited

U.S. PATENT DOCUMENTS

| | | | | |
|---|---|---|---|---|
| 10,094,721 | B2 | 10/2018 | Saeki | |
| 10,422,721 | B2 * | 9/2019 | Ibrahim | H01S 5/06821 |
| 2013/0335740 | A1 * | 12/2013 | Ishimaru | G01J 3/0224<br>356/365 |
| 2017/0160148 | A1 * | 6/2017 | Saeki | G01B 11/168 |
| 2017/0199116 | A1 * | 7/2017 | Yasuno | G01N 21/21 |
| 2021/0018312 | A1 * | 1/2021 | Nakamura | G01B 9/02091 |
| 2023/0049459 | A1 * | 2/2023 | Kane | H01S 5/0071 |

OTHER PUBLICATIONS

Polarization Sensitive OCT (PS-OCT) System Telesto® Series, https://www.thorlabs.co.jp/newgrouppage9.cfm?objectgroup_id=12543, Copyright © 1999-2024 Thorlabs, Inc., total 6 pages.

* cited by examiner

MEASURING DEVICE AND RECORDING MEDIUM UTILIZING A POLARIZED LIGHT PHASE DIFFERENCE TO OBTAIN A STRESS DISTRIBUTION

CROSS REFERENCE TO RELATED APPLICATION

This application is a Continuation of PCT International Application No. PCT/JP2022/000616, filed on Jan. 12, 2022, which is hereby expressly incorporated by reference into the present application.

TECHNICAL FIELD

The present disclosure relates to a measuring device that measures a birefringence distribution of a material that is a measurement object.

BACKGROUND ART

As for a method for measuring an internal stress distribution in a measurement object, a method for performing stress tomographic measurement of a measurement object using polarization sensitive optical coherence tomography (PS-OCT) that handles two beams of polarized light is proposed in Patent Literature 1.

A stress visualization device disclosed in Patent Literature 1 calculates a stress distribution at a tomographic position specified on the basis of a phase difference between a horizontal polarized light component and a vertical polarized light component in interference light obtained by combining object light of light having a single wavelength from a light source reflected by a measurement object with reference light reflected by a reference mirror, and visualizes a stress distribution in the measurement object in a tomographic visualization on the basis of a calculation result.

CITATION LIST

Patent Literature

Patent Literature 1: WO 2016 027874 A1

SUMMARY OF INVENTION

Technical Problem

In the measurement of the stress distribution described in Patent Literature 1, although the stress distribution is obtained on the basis of the polarized light phase difference between the horizontal polarized light component and the vertical polarized light component of the interference light intensity by the interference light obtained by combining the reflected light from the object irradiated with a part of the light having a single wavelength from a light source with the reference light from the reference mirror irradiated with a part of the light having a single wavelength from the light source, it is difficult to distinguish between a polarized light phase difference caused by a change or a distribution of a stress present inside the material that is a measurement object and a polarized light phase difference caused by the material, such as an orientation degree or a crystallinity of molecules in the material that is a measurement object, and when the polarized light phase difference caused by the material has a distribution in a depth direction, the polarized light phase difference caused by the material deviates at a portion different from the polarized light phase difference caused by the material in a calibration object, and therefore it is difficult to obtain a highly accurate stress distribution on the measurement object.

The present disclosure solves the above problem, and an object of the present disclosure is to obtain a measuring device capable of measuring a birefringence distribution of a material that is a measurement object by eliminating an influence of a polarized light phase difference caused by a material, such as an orientation degree or a crystallinity of molecules in the material that is a measurement object, or capable of measuring a polarized light phase difference caused by the material that is a measurement object when there is no stress distribution due to a polarized light phase difference caused by a change or a distribution of a stress present inside the material that is a measurement object.

Solution to Problem

A measuring device according to the present disclosure includes: a light emitter to selectively emit each of a plurality of beams of light having respective different wavelength bands; a splitter to split light in a wavelength band selected and emitted by the light emitter into measurement light and reference light, and to emit the measurement light and the reference light; a light transceiver to irradiate a measurement object with the measurement light from the splitter and to receive reflected light obtained by reflection of the emitted measurement light by the measurement object; an interferometer to combine the reference light with the reflected light from the light transceiver, to separate the combined light into two orthogonal beams of polarized light, to convert the two beams of polarized light into two analog electrical signals, and to output the two analog electrical signals; an analog-to-digital converter to convert the two analog signals from the interferometer into digital electrical signals and to output the digital electrical signals as two digital signals; and calculation processing circuitry to convert the digital electrical signals corresponding to the two beams of polarized light from the analog-to-digital converter into frequency spectra for each of the plurality of beams of light emitted from the light emitter, to calculate an optical path length difference between the reference light and the measurement light, to obtain a polarized light phase difference between the two beams of polarized light for each of the plurality of beams of light, and to obtain wavelength dependency of the polarized light phase difference.

Advantageous Effects of Invention

According to the present disclosure, a polarized light phase difference between two beams of polarized light is obtained for each of a plurality of beams of light having respective different wavelength bands. Therefore, wavelength dependency in the polarized light phase difference between two beams of polarized light is obtained, a stress distribution present inside a material that is a measurement object can be obtained by eliminating an influence of the polarized light phase difference caused by the material that is a measurement object, or the polarized light phase difference caused by the material can be measured in a state where there is no stress distribution due to the polarized light phase difference caused by a change or a distribution of a stress present inside the material that is a measurement object.

DESCRIPTION OF EMBODIMENTS

First Embodiment

Figure 1:
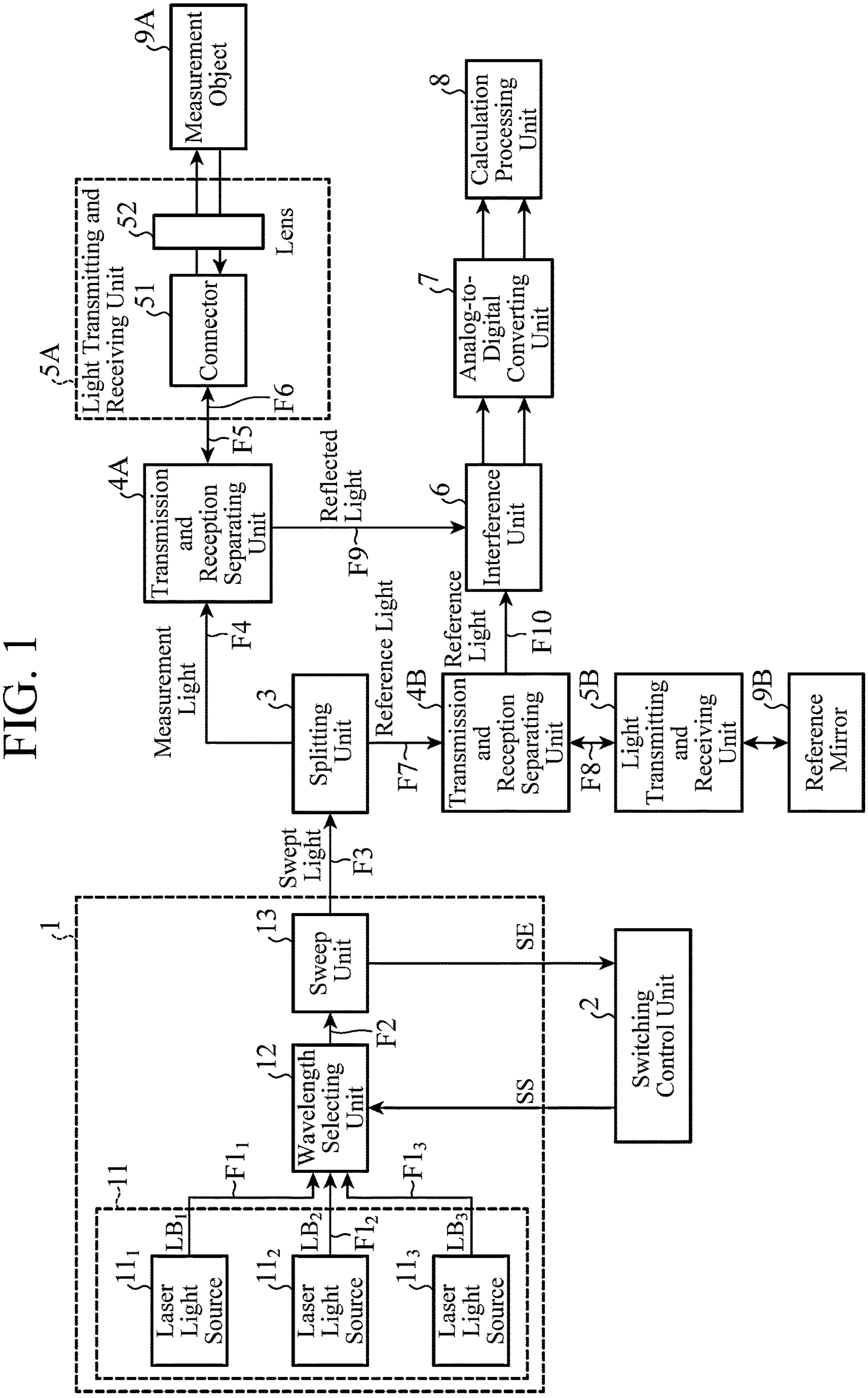
FIG. 1 is a block diagram illustrating a configuration of a main part of a measuring device according to a first embodiment.

A measuring device according to a first embodiment will be described with reference to FIGS. 1 to 6.

The measuring device according to the first embodiment is a measuring device that measures a birefringence distribution of a material that is a measurement object, and specifically, is a measuring device capable of obtaining a stress distribution present inside the material that is a measurement object by eliminating an influence of a polarized light phase difference caused by the material, such as an orientation degree or a crystallinity of molecules in the material that is a measurement object (hereinafter, abbreviated as a material-induced polarized light phase difference), or capable of measuring the material-induced polarized light phase difference when there is no polarized light phase difference caused by a change or a distribution of a stress present inside the material that is a measurement object (hereinafter, abbreviated as a stress-induced polarized light phase difference).

The distribution here refers to a geometric distribution of the material that is a measurement object in a depth direction.

The measuring device according to the first embodiment obtains interference light (combined light) by causing each of beams of reflected light from a measurement object with respect to a plurality of laser beams having respective different wavelength bands to interfere with reference light, obtains frequency spectra for two orthogonal beams of polarized light, that is, a horizontally polarized light component and a vertically polarized light component, obtains a phase difference between the two polarized light components, obtains wavelength dependency of the polarized light phase difference using the obtained polarized light phase difference, and measures an internal stress distribution in the measurement object, or measures a material-induced polarized light phase difference when there is no stress-induced polarized light phase difference.

Note that the measuring device may be any device as long as it can measure at least one of measurement of a stress distribution inside a material that is a measurement object and measurement of a material-induced polarized light phase difference.

The measuring device according to the first embodiment uses a wavelength scanning interferometry (Swept Source-OCT: SS-OCT) which is a type of polarization sensitive optical interferometry (PS-OCT) using two orthogonal beams of polarized light.

A retardation R, which is a phase difference between two orthogonal beams of polarized light, that is, a polarized light phase difference, is expressed by the following equation (1).

$$\delta = C \times t \times (\sigma 1 - \sigma 2) \tag{1}$$

In Equation (1), δ represents a phase difference R (retardation) between two orthogonal beams of polarized light, C represents a proportional constant, t represents the thickness of a material that is a measurement object, and (σ1−σ2) represents a main stress difference. σ1 represents a stress in one of the two orthogonal beams of polarized light, and σ2 represents a stress in the other of the two orthogonal beams of polarized light.

In addition, the retardation R can also be said to be a difference in refractive index between the two orthogonal beams of polarized light.

That is, by obtaining the phase difference δ between the two orthogonal beams of polarized light, the main stress difference (σ1−σ2) is obtained, and a stress distribution of a material that is a measurement object in a depth direction is obtained.

At this time, the phase difference δ between the two orthogonal beams of polarized light obtained by measuring a single wavelength is a sum of a stress-induced polarized light phase difference and a material-induced polarized light phase difference.

The material-induced polarized light phase difference varies depending on an orientation degree or a crystallinity of molecules in a material.

Therefore, the measuring device according to the first embodiment measures an internal stress distribution in a measurement object by eliminating an influence of a material-induced polarized light phase difference, or measures the material-induced polarized light phase difference when there is no stress-induced polarized light phase difference.

That is, the measuring device according to the first embodiment obtains wavelength dependency of a polarized light phase difference in the polarized light phase difference δ using the phase difference δ between two orthogonal beams of polarized light for a plurality of laser beams having respective different wavelength bands, and obtains a birefringence distribution inside a material that is a measurement object.

Hereinafter, obtaining a geometric distribution of the retardation R in a plurality of different wavelength bands is referred to as obtaining wavelength dependency of birefringence.

In short, by using the fact that a slope (∂δ/∂λ) of a phase difference δ between two orthogonal beams of polarized light with respect to a wavelength λ is proportional to a stress-induced polarized light phase difference δstress for each position in a depth direction of a measurement object, the measuring device according to the first embodiment compares the slope (∂δ/∂λ) with a calibration characteristic line in a calibration object, and thus calibrates the phase difference δ between the two orthogonal beams of polarized light for each of different wavelength bands measured for the measurement object, thereby eliminating an influence of a stress distribution due to a material-induced polarized light phase difference and obtaining a stress distribution due to a stress-induced polarized light phase difference. In a case where there is no stress distribution due to a stress-induced polarized light phase difference, that is, in a case where there is no slope of the phase difference δ between two orthogonal beams of polarized light with respect to a wavelength, that is, when the slope is zero, a stress distribution due to a material-induced polarized light phase difference is obtained.

The calibration object is a sample made of the same material as that of the measurement object.

As for the calibration characteristic line in the calibration object, in acquisition of the calibration characteristic line by measurement in which a known stress is applied to the calibration object, a phase difference δ0 between two orthogonal beams of polarized light is measured by applying the known stress to each of the plurality of different wavelength bands using the measuring device according to the first embodiment, and the calibration characteristic line indicating a correlation between the phase difference δ0 of the two orthogonal beams of polarized light and the stress is obtained before the measurement of the measurement object, that is, in advance.

The calibration characteristic line in the calibration object is a characteristic line obtained using stress dependency of the polarized light phase difference δ0 measured for a plurality of different wavelength bands and based on wavelength dependency of the polarized light phase difference δ0 with respect to a stress.

Figure 5:
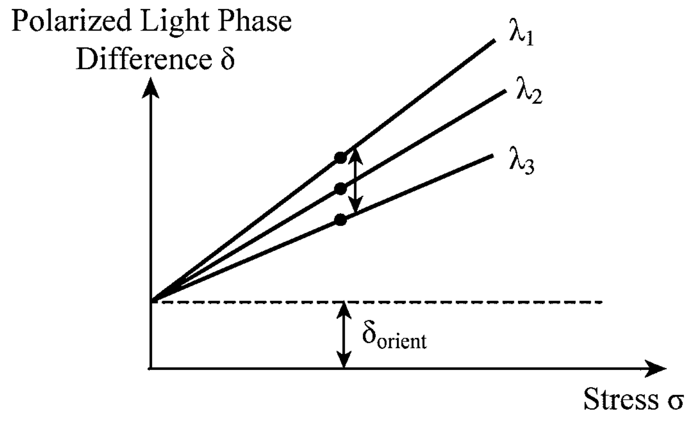
FIG. 5 is a diagram for explaining a correlation between a retardation and a stress inside a material in the measuring device according to the first embodiment.

That is, a relationship between the phase difference δ between two orthogonal beams of polarized light and the stress σ applied to the calibration object, for each wavelength, indicates a characteristic line different depending on each wavelength as illustrated in FIG. 5. The stress σ is a sum of a stress caused by a stress and a stress caused by a material. The slope of the characteristic line corresponds to a photoelastic coefficient.

That is, FIG. 5 illustrates a polarized light phase difference δ with respect to a stress σ at each wavelength at a certain measurement position in a depth direction of a calibration object, and indicates that the polarized light phase difference δ has stress dependency, particularly stress dependency caused by a stress.

The polarized light phase difference δ is a sum of a stress-induced polarized light phase difference δstress and a material-induced polarized light phase difference δorient.

In FIG. 5, the x-axis indicates a stress σ, the z-axis indicates a polarized light phase difference δ, and λ1 to λ3 are 1510 nm, 1550 nm, and 1590 nm, respectively, for example.

Figure 6:
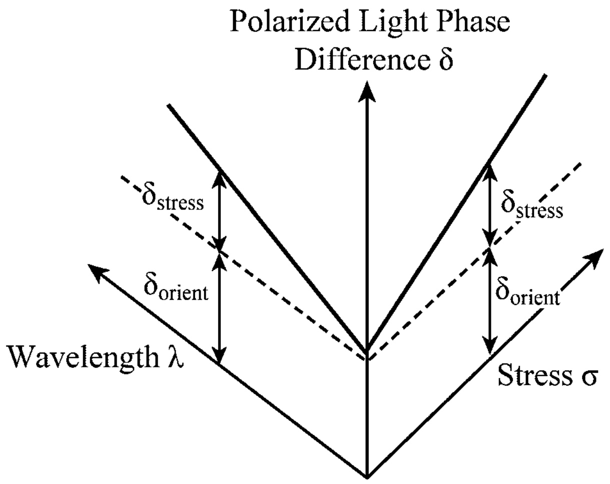
FIG. 6 is a diagram for explaining a correlation among a retardation, a stress inside a material, and a wavelength in the measuring device according to the first embodiment.

Meanwhile, a relationship between the polarized light phase difference δ and the wavelength λ is understood also from FIG. 5. As illustrated in FIG. 6, the polarized light phase difference δ has wavelength dependency. In this example, a slope (∂δ/∂λ) of the polarized light phase difference δ to the wavelength λ is proportional to the stress-induced polarized light phase difference δstress for each measurement position of a measurement object in a depth direction.

In addition, the slope (∂δ/∂λ) of the polarized light phase difference δ to the wavelength λ is independent of the material-induced polarized light phase difference δorient.

As a result, by obtaining the wavelength dependency in the polarized light phase difference δ, an influence of the material-induced polarized light phase difference δorient is eliminated, and a stress distribution inside a material that is a measurement object can be found.

In FIG. 6, the x-axis represents the stress σ, the y-axis represents the wavelength λ, and the z-axis represents the polarized light phase difference δ.

In this way, by obtaining the wavelength dependency in the polarized light phase difference δ in the calibration object and comparing the wavelength dependency with the polarized light phase difference in each wavelength band in the measurement object, an influence of the material-induced polarized light phase difference δorient (intercept) is eliminated, and a stress distribution inside the material that is a measurement object is obtained by a calibration characteristic line of a stress indicating a correlation between the polarized light phase difference δ and the stress σ in the calibration object.

The measurement object is a birefringent material such as a plastic, a crystal, or a biological tissue, for example, a thin polyethylene terephthalate (PET) material, a semiconductor, an optical element typified by a lens and an optical fiber, a resin used for lens mounting and the like, a polarization-maintaining fiber, an eyeball for performing fundus examination in the medical field, or the biological tissue including myelin and collagen wrapping a ganglion.

As the measurement object, a material having no dependency on a wavelength with respect to a stress change, a metal material that does not transmit light at all, and a gas that does not reflect light at all and transmits light are not suitable.

As illustrated in FIG. 1, the measuring device according to the first embodiment includes a light emitting unit 1 that is a laser light emitting unit, a switching control unit 2, a splitting unit 3, transmission and reception separating units 4A and 4B, light transmitting and receiving units 5A and 5B, an interference unit 6, an analog-to-digital (A/D) converting unit 7, and a calculation processing unit 8.

The light emitting unit 1 selectively and sequentially emits each of a plurality of laser beams having respective different wavelength bands.

The light emitting unit 1 includes a light source 11, a wavelength selecting unit 12, and a sweep unit 13.

The light source 11 emits a plurality of laser beams having respective different wavelengths λ1 to λn.

The light source 11 includes n laser light sources $\mathbf{11}_1$ to $\mathbf{11}_n$.

n is a natural number equal to or more than 2, and is 3 in the first embodiment.

The first laser light source $\mathbf{11}_1$ emits a first laser beam $LB_1$ made of continuous light having a first wavelength λ1.

The second laser light source $\mathbf{11}_2$ emits a second laser beam $LB_2$ made of continuous light having a second wavelength λ2.

The third laser light source $\mathbf{11}_3$ emits a third laser beam $LB_3$ made of continuous light having a third wavelength λ3.

For example, as an example, the first wavelength λ1 is 1510 nm, the second wavelength λ2 is 1550 nm, and the third wavelength λ3 is 1590 nm.

A fourth laser light source may be further disposed, the first wavelength λ1 may be 405 nm, the second wavelength λ2 may be 435 nm, the third wavelength λ3 may be 510 nm, and a fourth wavelength λ4 emitted from the fourth laser light source may be 635 nm.

The wavelength selecting unit 12 receives, as an input, a plurality of laser beams $LB_1$ to $LB_3$ from the light source 11, receives a switching signal SS from the switching control unit 2, and sequentially emits a laser beam selected from the input plurality of laser beams $LB_1$ to $LB_3$.

As for a selection frequency of the first laser beam $LB_1$ to the third laser beam $LB_3$, the wavelength selecting unit 12 may be controlled by the switching signal SS from the switching control unit 2, and the first laser beam $LB_1$ to the third laser beam $LB_3$ may be uniformly and sequentially repeated in this order, or the selection frequency may be non-uniform in such a manner that a selection frequency of the first laser beam $LB_1$ is increased and a selection frequency of the second laser beam $LB_2$ is decreased.

Output ends of the first laser light source $\mathbf{11}_1$ to the third laser light source $\mathbf{11}_3$ and corresponding input ends of the wavelength selecting unit 12 are connected by respective optical fibers $F\mathbf{1}_1$ to $F\mathbf{1}_3$.

The sweep unit 13 receives, as an input, the laser beam selected by the wavelength selecting unit 12, wavelength-sweeps the input laser beam in a corresponding band, and emits the swept laser beam as swept light.

The swept light emitted from the sweep unit 13 is a continuous wave laser beam.

When receiving, as an input, the first laser beam $LB_1$, the sweep unit 13 emits swept light in a wavelength band (λ1±Δλ1) obtained by wavelength-sweeping a sweep width in ±Δλ1 around the wavelength λ1.

When receiving, as an input, the second laser beam $LB_2$, the sweep unit 13 emits swept light in a wavelength band (λ2+Δλ2) obtained by wavelength-sweeping a sweep width in ±Δλ2 around the wavelength λ2.

When receiving, as an input, the third laser beam $LB_3$, the sweep unit 13 emits swept light in a wavelength band (λ3±Δλ3) obtained by wavelength-sweeping a sweep width in ±Δλ3 around the wavelength λ3.

Preferably, the wavelength band (λ1±Δλ1) to the wavelength band (λ3+Δλ3) do not overlap with each other, but the wavelength bands of the swept light emitted by the sweep unit 13 may partially overlap with each other when the first laser light source $\mathbf{11}_1$ to the third laser light source $\mathbf{11}_3$ are selected as long as a stress for and dependency on a wavelength of a laser beam for the phase difference δ (retardation R) between two orthogonal beams of polarized light can be measured.

In short, it is only required to obtain wavelength dependency between the phase difference δ between two orthogonal beams of polarized light and a stress, with respect to laser beams in a plurality of wavelength bands.

Note that the sweep width±Δλ is determined in consideration of the following points.

That is, the sweep width±Δλ is a range in which wavelength dependency can be ignored in a wavelength band (λ±Δλ) and which has a full width at half maximum (FWHM) of a peak on a spectrum for obtaining resolution.

In addition, a wavelength difference between different wavelengths, that is, each of a difference between the wavelengths of λ1 and λ2 and a difference between the wavelengths of λ2 and λ3 is a difference in which wavelength dependency is obtained in the phase difference δ between two orthogonal beams of polarized light.

When the first wavelength λ1 is 1510 nm, the second wavelength λ2 is 1550 nm, and the third wavelength λ3 is 1590 nm, illustrated as an example, the sweep width±Δλ is, for example, ±20 nm.

Therefore, when the wavelength selecting unit 12 selects the first laser light source $\mathbf{11}_1$, the sweep unit 13 emits laser beams in a wavelength band of 1510 nm±20 nm, when the wavelength selecting unit 12 selects the second laser light source $\mathbf{11}_2$, the sweep unit 13 emits laser beams in a wavelength band of 1550 nm±20 nm, and when the wavelength selecting unit 12 selects the third laser light source $\mathbf{11}_3$, the sweep unit 13 emits laser beams in a wavelength band of 1590 nm±20 nm.

When the first wavelength λ1 is 405 nm, the second wavelength λ2 is 435 nm, the third wavelength λ3 is 510 nm, and the fourth wavelength λ4 is 635 nm, the sweep width±Δλ is, for example, ±10 nm.

When sweep of the input laser beam selected by the wavelength selecting unit 12 is completed, the sweep unit 13 outputs a sweep end signal SE to the switching control unit 2.

When receiving the sweep end signal SE, the switching control unit 2 outputs a switching signal SS to the wavelength selecting unit 12.

The switching signal SS is a signal for the wavelength selecting unit 12 to determine a laser beam to be selected from the first laser beam $LB_1$ to the third laser beam $LB_3$ and to determine a timing for selection.

An output end of the wavelength selecting unit 12 and an input end of the sweep unit 13 are connected by an optical fiber F2.

Note that, in a case where a wavelength swept laser light source that generates a laser beam whose wavelength is continuously changed is used as the first laser light source $\mathbf{11}_1$ to the third laser light source $\mathbf{11}_3$, it is not necessary to particularly dispose the sweep unit 13.

The splitting unit 3 receives the swept light from the sweep unit 13, splits the swept light into measurement light and reference light at a set power ratio, for example, 9:1, and emits the measurement light and the reference light. The splitting unit 3 is constituted by, for example, an optical coupler.

An output end of the sweep unit 13 and an input end of the splitting unit 3 are connected by an optical fiber F3.

The transmission and reception separating unit 4A for measurement light receives, as an input, the measurement light from the splitting unit 3, and transmits the input measurement light to the light transmitting and receiving unit 5A.

The transmission and reception separating unit 4A receives, as an input, reflected light obtained by reflected by a measurement object 9A from the light transmitting and receiving unit 5A, and transmits the input reflected light to the interference unit 6.

The transmission and reception separating unit 4A is constituted by, for example, an optical circulator such as a three-port optical circulator.

A measurement light output end of the splitting unit 3 and an input end of the transmission and reception separating unit 4A are connected by an optical fiber F4.

An input and output end of the transmission and reception separating unit 4A and an input and output end of the light transmitting and receiving unit 5A are connected by an optical fiber F5.

The light transmitting and receiving unit 5A receives, as an input, the measurement light from the transmission and reception separating unit 4A, and irradiates the measurement object 9A with the input measurement light.

The light transmitting and receiving unit 5A receives reflected light that is light obtained by reflection of the measurement light emitted to the measurement object 9A on the measurement object 9A, and the received reflected light is transmitted to the transmission and reception separating unit 4A via the optical fiber F5.

The light transmitting and receiving unit 5A includes a connector 51 whose input and output end is connected to an input and output end of the light transmitting and receiving unit 5A via an optical fiber F6, and a lens system 52 that collimates and collects measurement light input to the connector 51, irradiates the measurement object 9 with the light, collects reflected light from the measurement object 9, and guides the collected reflected light to the connector 51.

The lens system 52 is constituted by a transmission lens or a reflection lens. The number of the transmission lenses or the reflection lenses is not limited to one, and may be plural.

Note that the light transmitting and receiving unit 5A may irradiate the measurement object 9A with light from an end of the optical fiber F6 connected to the connector 51, and may directly transmit reflected light from the measurement object 9A to the optical fiber F6, without including the lens system 52.

The transmission and reception separating unit 4B for reference light receives, as an input, the reference light from the splitting unit 3, and transmits the input reference light to the light transmitting and receiving unit 5B.

The transmission and reception separating unit 4B receives, as an input, reference light reflected by a reference mirror 9B from the light transmitting and receiving unit 5B, and transmits the input reference light to the interference unit 6.

The transmission and reception separating unit 4B has a similar configuration to the transmission and reception separating unit 4A.

A reference light output end of the splitting unit 3 and an input end of the transmission and reception separating unit 4B are connected by an optical fiber F7.

An input and output end of the transmission and reception separating unit 4B and an input and output end of the light transmitting and receiving unit 5B are connected by an optical fiber F8.

The transmission and reception separating unit 4B may be integrally constituted with the transmission and reception separating unit 4A, and in short, it is only required to perform transmission and reception of the measurement light separately from transmission and reception of the reference light via different paths.

The light transmitting and receiving unit 5B receives, as an input, the reference light from the transmission and reception separating unit 4B, and irradiates the reference mirror 9B with the input reference light.

The light transmitting and receiving unit 5B receives reference light that is light obtained by reflection of the reference light emitted to the reference mirror 9B on the reference mirror 9B, and the received reference light is transmitted to the transmission and reception separating unit 4B via the optical fiber F8.

The light transmitting and receiving unit 5B may be integrally constituted with the light transmitting and receiving unit 5A, and in short, it is only required to perform emission of the measurement light to the measurement object 9A and reception of the measurement light from the measurement object 9A separately from emission of the reference light to the reference mirror 9B and reception of the reference light from the reference mirror 9B via different paths.

An optical distance of the measurement light emitted from the lens system 52 of the light transmitting and receiving unit 5A onto the measurement object 9A and an optical distance of the reference light emitted from the light transmitting and receiving unit 5B onto the reference mirror 9B coincide with each other.

The interference unit 6 receives, as an input, the reference light from the transmission and reception separating unit 4B and the reflected light from the transmission and reception separating unit 4A, combines the input reflected light with the reference light, and obtains combined light having a beat frequency component proportional to an optical path length of the reflected light and an optical path length of the reference light. The obtained combined light is separated into two orthogonal beams of polarized light, that is, a horizontal polarized light component and a vertical polarized light component, each of the horizontal polarized light component and the vertical polarized light component is converted from an optical signal to an electrical signal, and the horizontal component analog signal and the vertical component analog signal are transmitted to the A/D converting unit 7.

The reference light from the transmission and reception separating unit 4B and the reflected light from the transmission and reception separating unit 4A input to the interference unit 6 at this time are based on the laser beam selected by the wavelength selecting unit 12.

The combined light obtained by combining the reference light from the transmission and reception separating unit 4B and the reflected light from the transmission and reception separating unit 4A is generally called interference light.

An output end of the transmission and reception separating unit 4A and a reflected light input end of the interference unit 6 are connected by an optical fiber F9. The optical fiber F9 is preferably a polarization-maintaining fiber.

An output end of the transmission and reception separating unit 4B and a reference light input end of the interference unit 6 are connected by an optical fiber F10. The optical fiber F10 is preferably a polarization-maintaining fiber.

The polarization-maintaining fiber is an optical fiber that maintains a state of two orthogonal beams of polarized light, and can prevent an influence on a retardation caused by a cause other than the inside of the measurement object.

In addition, in order to expand a measurement range, a plurality of paths of reference light from the reference light output end of the splitting unit 3 to the reference light input end of the interference unit 6 may be provided.

Figure 2:
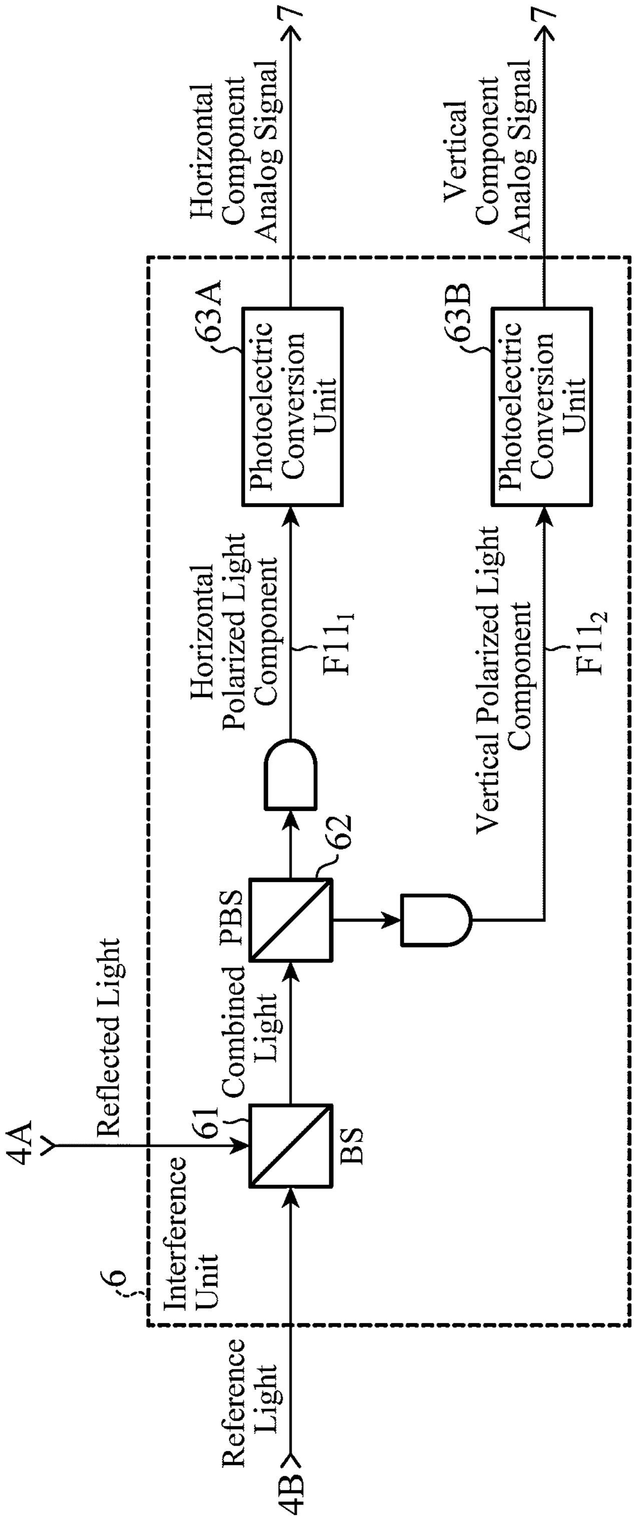
FIG. 2 is a diagram illustrating a configuration of an interference unit in the measuring device according to the first embodiment.

As illustrated in FIG. 2, the interference unit 6 includes a beam splitter (BS) 61, a polarized beam splitter (PBS) 62, a first photoelectric conversion unit 63A, and a second photoelectric conversion unit 63B.

The beam splitter 61 receives, as an input, the reference light from the transmission and reception separating unit 4B and the reflected light from the transmission and reception separating unit 4A, and combines the input reflected light and reference light.

The beam splitter 61 is a half mirror that transmits the reference light from the transmission and reception separating unit 4B and reflects the reflected light from the transmission and reception separating unit 4A, and the reference light that has passed through the half mirror and the reflected light from the transmission and reception separating unit 4A reflected by the half mirror are combined and emitted as combined light, that is, interference light.

The polarized beam splitter 62 separates the combined light from the beam splitter 61 into two orthogonal beams of polarized light, that is, a horizontal polarized light component and a vertical polarized light component. The horizontal polarized light component is transmitted to the first photoelectric conversion unit 63A via an optical fiber F111, and the vertical polarized light component is transmitted to the second photoelectric conversion unit 63B via an optical fiber F112. Each of the optical fiber F111 and the optical fiber F112 is preferably a polarization-maintaining fiber.

The first photoelectric conversion unit 63A converts an optical signal of the horizontal polarized light component from the polarized beam splitter 62 into an electrical signal and transmits the electrical signal to the A/D converting unit 7 as an analog signal of the horizontal polarized light component.

The second photoelectric conversion unit 63B converts an optical signal of the vertical polarized light component from the polarized beam splitter 62 into an electrical signal and transmits the electrical signal to the A/D converting unit 7 as an analog signal of the vertical polarized light component.

Each of the first photoelectric conversion unit 63A and the second photoelectric conversion unit 63B is, for example, a photodetector.

Hereinafter, the analog signal of the horizontal polarized light component is referred to as a horizontal component analog signal, and the analog signal of the vertical polarized light component is referred to as a vertical component analog signal.

Note that the interference unit 6 is not limited to one including the beam splitter 61 and the polarized beam splitter 62, and may be any of a spatial optical system, an optical fiber system, and an optical integrated circuit using a silicon photonics technique as long as combining beams of light and separation of beams of polarized light are possible.

In a case where an optical integrated circuit is used, the interference unit 6 is constituted by an optical integrated circuit in which the first photoelectric conversion unit 63A and the second photoelectric conversion unit 63B are incorporated.

In addition, an intradyne coherent receiver (ICR) used in optical information communication may be used for the interference unit 6.

Since the ICR can separate combined light into two orthogonal beams of polarized light, the ICR can also serve as the polarized beam splitter 62, the first photoelectric conversion unit 63A, and the second photoelectric conversion unit 63B in the interference unit 6.

In this case, the interference unit 6 includes the beam splitter 61 and the ICR.

The A/D converting unit 7 converts the horizontal component analog signal and the vertical component analog signal from the interference unit 6 into digital signals, and outputs the digital signals as a horizontal component digital signal and a vertical component digital signal, to the calculation processing unit 8.

The calculation processing unit 8 receives, as an input, the horizontal component digital signal and the vertical component digital signal from the A/D converting unit 7, and obtains distance measurement to the measurement object 9A and a retardation R inside the measurement object 9A using the input horizontal component digital signal and vertical component digital signal.

The retardation R indicates a polarized light phase difference δ between two orthogonal beams of polarized light, that is, between the horizontal polarized light component and the vertical polarized light component.

The calculation processing unit 8 obtains the polarized light phase difference δ as a polarized light phase difference distribution δ(z) in a depth direction.

The distance measurement to the measurement object 9A by the calculation processing unit 8 is performed by performing Fourier transform on a beat frequency obtained by a difference between an optical path length of the reference light and an optical path length of the measurement light, obtained by combining the reference light and the reflected light from the measurement light. That is, the distance measurement to the measurement object 9A is performed by using the horizontal component digital signal and the vertical component digital signal.

Since the distance measurement to the measurement object 9A is performed by a generally performed method, detailed description thereof will be omitted.

The distance measurement to the measurement object 9A means measurement of a distance from an emission position of the measurement light, specifically, from the lens system 52A to the measurement object 9A.

Using the horizontal component digital signal and the vertical component digital signal from the A/D converting unit 7 for each of the plurality of laser beams in respective different wavelength bands, the calculation processing unit 8 obtains a polarized light phase difference δ between two orthogonal beams of polarized light, that is, between the horizontal polarized light component and the vertical polarized light component with respect to laser beams in respective different wavelength bands.

That is, the calculation processing unit 8 obtains the phase difference δ between two orthogonal beams of polarized light in each wavelength band, and as a result, a distribution of a difference of the polarized light phase difference δ between wavelengths λ is obtained, and wavelength dependency in the polarized light phase difference δ is obtained.

In addition, a slope (∂δ/∂λ) of the phase difference δ between two orthogonal beams of polarized light with respect to a wavelength λ is proportional to a stress-induced polarized light phase difference δstress for each measurement position of a measurement object in a depth direction.

Therefore, the wavelength dependency of birefringence in a material that is the measurement object 9A is obtained by obtaining the wavelength dependency in the difference of the polarized light phase difference.

The calculation processing unit 8 obtains a stress distribution of a material that is the measurement object 9A in a depth direction by using a calibration characteristic line in a calibration object for the polarized light phase difference δ with respect to a laser beam in each wavelength band with respect to the measurement object 9A.

Figure 3:
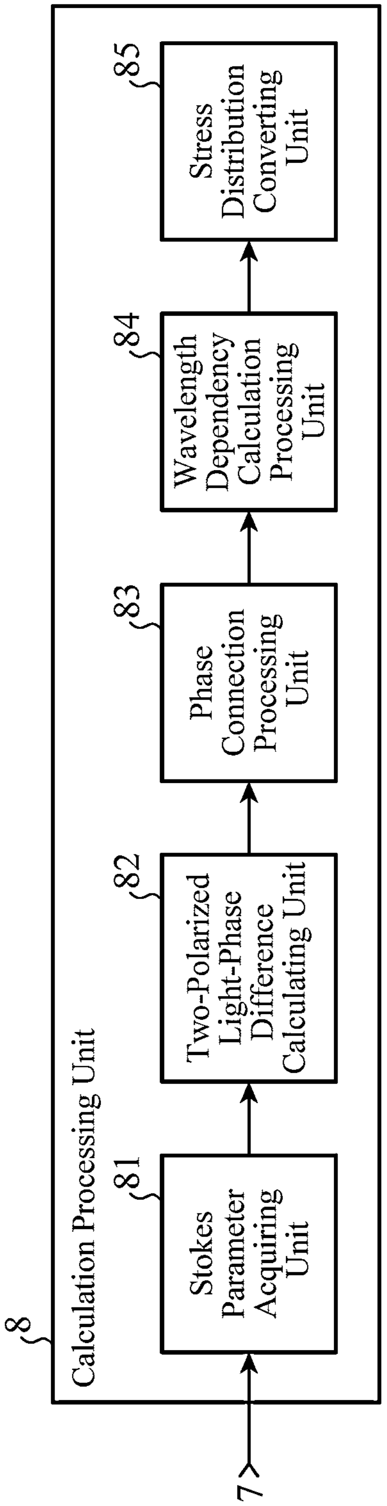
FIG. 3 is a block diagram of a calculation processing unit in the measuring device according to the first embodiment.

As illustrated in FIG. 3, the calculation processing unit 8 includes a Stokes parameter acquiring unit 81, a two-polarized light-phase difference calculating unit 82, a phase connection processing unit 83, a wavelength dependency calculation processing unit 84, and a stress distribution converting unit 85.

The calculation processing unit 8 includes a central processing unit (CPU), a read only memory (ROM), a random access memory (RAM), a hard disk, and the like, and calculation processing is performed by hardware thereof and a program stored in the ROM, that is, software.

The Stokes parameter acquiring unit 81 calculates one or more Stokes parameters using the horizontal component digital signal and the vertical component digital signal from the A/D converting unit 7 and acquires the Stokes parameters.

The Stokes parameters are obtained, for example, by converting the horizontal component digital signal and the vertical component digital signal from the A/D converting unit 7 into four-phase digital signals of 0, π/2, π, and 3π/4 by a phase modulator (EOM) (not illustrated), and solving simultaneous equations from each phase shift amount using a four-phase shift method using the four-phase horizontal component digital signal and vertical component digital signal by the Stokes parameter acquiring unit 81, that is, by performing inverse calculation of a matrix.

That is, the Stokes parameters are obtained by performing inverse calculation (Fourier transform) of a matrix from the four-phase horizontal component digital signal and vertical component digital signal.

The two-polarized light-phase difference calculating unit 82 applies Fourier analysis to the Stokes parameters acquired by the Stokes parameter acquiring unit 81, and calculates a distribution $\delta_1(z)$ of a polarized light phase difference $\delta_1$ of the measurement object 9*a* in a depth direction (hereinafter, referred to as a polarized light phase difference distribution $\delta_1(z)$).

Because in the polarized light phase difference distribution δ1(z) obtained by the two-polarized light-phase difference calculating unit 82, the polarized light phase difference $\delta_1$ between the horizontal polarized light component and the vertical polarized light component has the same value for every 2π, the phase connection processing unit 83 connects discontinuous points, that is, performs phase connection processing, and acquires a polarized light phase difference distribution δ(z) continuous in the depth direction.

The wavelength dependency calculation processing unit 84 acquires a slope distribution of a polarized light phase difference with respect to a wavelength using the polarized light phase difference distribution δ(z) with respect to all the wavelength bands obtained by the phase connection processing unit 83, calculates a slope (∂δ/∂λ) of the polarized light phase difference δ to a wavelength λ by differentiating the polarized light phase difference δ by the wavelength λ, and acquires the slope (∂δ/∂λ) of the polarized light phase difference δ to the wavelength λ in the depth direction.

By comparing the slope (∂δ/∂λ) of the polarized light phase difference δ to the wavelength λ for all the wavelength bands obtained by the wavelength dependency calculation processing unit 84 with a calibration characteristic line in a calibration object obtained in advance, the stress distribution converting unit 85 calibrates the phase difference δ between two orthogonal beams of polarized light for each of different wavelength bands measured for the measurement object, and converts the slope (∂δ/∂λ) into a stress by referring to the calibration characteristic line using the calibrated polarized light phase difference δ, thus acquiring a stress distribution in the depth direction.

In the stress distribution obtained by the stress distribution converting unit 85, an influence of the stress distribution due to the material-induced polarized light phase difference is eliminated, and a stress distribution present inside a material that is the measurement object 9A can be measured with high accuracy.

In addition, in a case where there is no stress distribution due to the stress-induced polarized light phase difference, the stress distribution obtained by the stress distribution converting unit 85 can be obtained as a stress distribution due to the material-induced polarized light phase difference.

Next, a measuring method by the calculation processing unit 8 in the measuring device according to the first embodiment will be described using the measurement sequence illustrated in FIG. 4.

Figure 4:
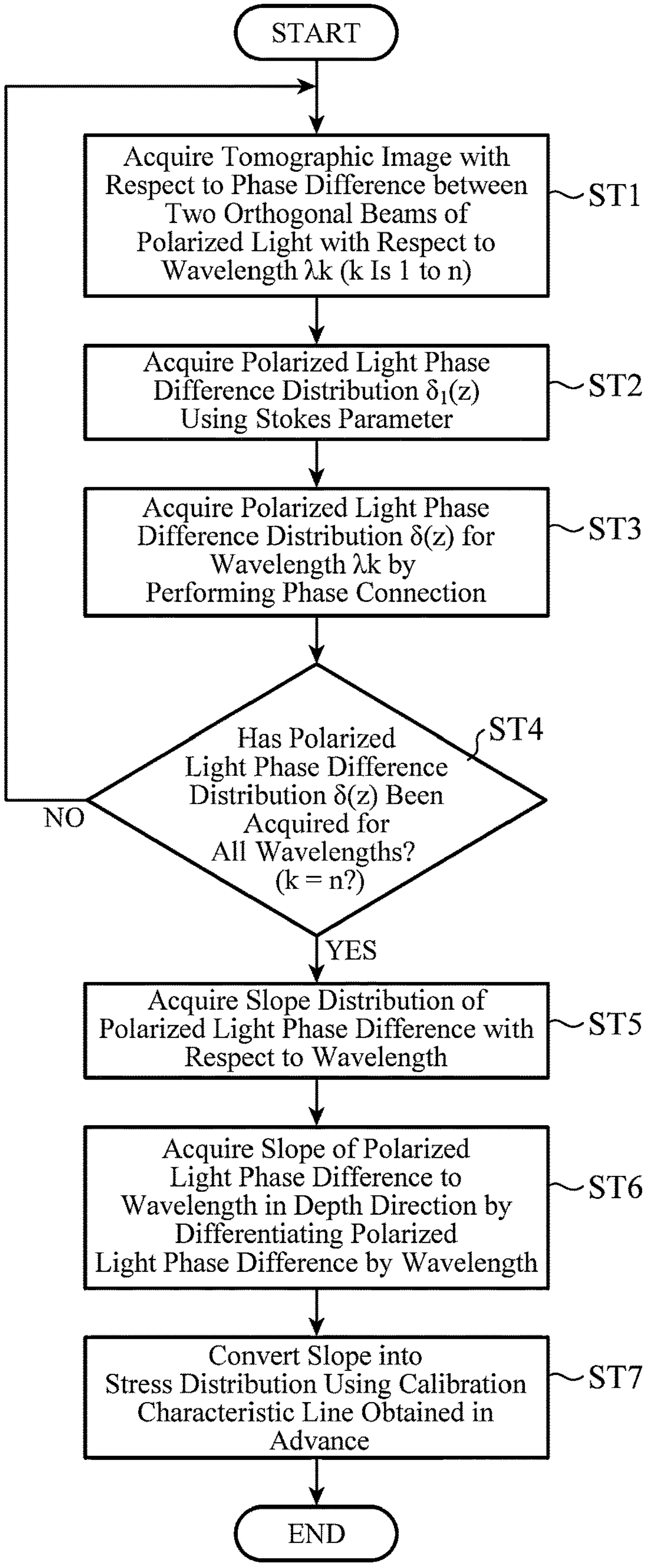
FIG. 4 is a flowchart illustrating a measurement sequence of the calculation processing unit in the measuring device according to the first embodiment.

The measurement sequence illustrated in FIG. 4 mainly illustrates processing performed by the calculation processing unit 8.

First, in step ST1, the Stokes parameter acquiring unit 81 receives a four-phase horizontal component digital signal and vertical component digital signal with respect to a wavelength λ1 from the A/D converting unit 7, and acquires a tomographic image with respect to a phase difference between horizontally polarized light and vertically polarized light, that is, between the two orthogonal beams of polarized light with respect to a wavelength λk (k is 1 to n).

In step ST2, the Stokes parameter acquiring unit 81 calculates one or more Stokes parameters by performing inverse calculation of a matrix from the acquired four-phase horizontal component digital signal and vertical component digital signal with respect to the wavelength λk.

Then, the two-polarized light-phase difference calculating unit 82 calculates the polarized light phase difference distribution $\delta_1(z)$ with respect to the wavelength λk by applying Fourier analysis to the Stokes parameters acquired by the Stokes parameter acquiring unit 81.

In step ST3, the phase connection processing unit 83 acquire a polarized light phase difference distribution δ(z) with respect to the wavelength λk by performing phase connection processing on the polarized light phase difference distribution $\delta_1(z)$ calculated by the phase difference calculating unit 82, and the processing proceeds to step ST4.

In step T4, it is determined whether or not acquisition of the polarized light phase difference distribution δ(z) has been performed for all the wavelengths, that is, from the wavelength λ1 to the wavelength λn. If the acquisition of the polarized light phase difference distribution δ(z) has not been performed for all the wavelengths, the processing returns to step ST1, and steps ST2, ST3, and ST4 are repeated.

In step ST4, if it is determined that the acquisition of the polarized light phase difference distribution δ(z) has been completed for all the wavelengths, the processing proceeds to step ST5.

In step ST5, the wavelength dependency calculation processing unit 84 acquires a slope distribution of a polarized light phase difference with respect to a wavelength using the polarized light phase difference distribution δ(z) for all the wavelength bands obtained by the phase connection processing unit 83.

In step ST6, the wavelength dependency calculation processing unit 84 acquires a distribution of a slope (∂δ/∂λ) of the polarized light phase difference δ with respect to the wavelength λ in the depth direction by differentiating the polarized light phase difference δ by the wavelength A.

In step ST7, the stress distribution converting unit 85 calibrates the phase difference δ between two orthogonal beams of polarized light for each of different wavelength bands measured for the measurement object by comparing the slope (∂δ/∂λ) of the polarized light phase difference δ to the wavelength 2 obtained by the wavelength dependency calculation processing unit 84 with a calibration characteristic line in a calibration object, and converts the slope (∂δ/∂λ) into a stress corresponding to the polarized light phase difference distribution δ(z) by referring to the calibration characteristic line using the calibrated polarized light phase difference δ, thus acquiring a stress distribution in the measurement object 9*a* in the depth direction and ending the processing.

The calibration characteristic line in the calibration object is obtained by performing the following measurement in advance.

That is, a known stress is applied to the calibration object for each of the plurality of laser beams in different wavelength bands, and steps ST1 to ST3 illustrated in FIG. 4 are repeated. As a result, a relationship between the polarized light phase difference δ between the horizontally polarized light and the vertically polarized light and the stress σ applied to the calibration object, as illustrated in FIG. 5, is obtained as a polarized light phase difference-stress characteristic line that varies depending on a wavelength.

Furthermore, by executing steps ST5 and ST6, a polarized light phase difference-wavelength characteristic line indicating the slope (∂δ/∂λ) of the polarized light phase difference δ to the wavelength 2 illustrated in FIG. 6 is obtained.

The calibration characteristic line is a characteristic line including the polarized light phase difference-stress characteristic line and the polarized light phase difference-wavelength characteristic line thus obtained.

Note that, in the measurement of the measurement object 9A and the calibration object, ideally, it is desirable to perform the measurement under a condition in which an air layer from a light emitting unit of the measurement light from the light transmitting and receiving unit 5A and a light receiving unit of the reflected light in the light transmitting and receiving unit 5A to the measurement object 9A and the calibration object does not have a retardation variation.

The program stored in the ROM constituting the calculation processing unit 8 and executed by the CPU includes: a first procedure of calculating one or more Stokes parameters by performing inverse calculation of a matrix from the four-phase horizontal component digital signal and vertical component digital signal for the wavelength λ1; a second procedure of calculating the polarized light phase difference distribution $\delta_1(z)$ for the wavelength λk by applying Fourier analysis to the Stokes parameters; a third procedure of acquiring the polarized light phase difference distribution δ(z) for the wavelength λk by performing phase connection processing on the polarized light phase difference distribution $\delta_1(z)$; a fourth procedure of obtaining the distribution of the inclination (∂δ/∂λ) of the polarized light phase difference δ to the wavelength λ in the depth direction by calculating a slope distribution of the polarized light phase difference with respect to the wavelength using the polarized light phase difference distribution δ(z) for the wavelength λ1 to the wavelength λn; and a fifth procedure of acquiring a stress distribution of the measurement object 9*a* in the depth direction by converting the slope (∂δ/∂λ) of the polarized light phase difference δ for the wavelength λ into a stress corresponding to the polarized light phase difference distribution δ(z) by referring to the calibration characteristic line in the calibration object.

As described above, the measuring device according to the first embodiment calculates an optical path length difference between the reference light and the measurement light by converting the digital electrical signals for the horizontally polarized light and the vertically polarized light from the analog-to-digital converting unit 7 into frequency spectra for each of the plurality of laser beams having respective different wavelengths λ1 to λn emitted from the light emitting unit 1, obtains a polarized light phase difference between the horizontally polarized light and the vertically polarized light for each of the plurality of laser beams having wavelengths λ1 to λn, and obtains wavelength dependency of the polarized light phase difference. Therefore, the measuring device according to the first embodiment has an effect that a stress distribution present inside a material that is the measurement object 9A can be obtained by eliminating an influence of the material-induced polarized light phase difference δorient, or the material-induced polarized light phase difference δorient can be measured when there is no stress-induced polarized light phase difference δstress.

In addition, the measuring device according to the first embodiment can expand a measurement range by arranging a plurality of paths of the reference light from the reference light output end of the splitting unit 3 to the reference light input end of the interference unit 6.

Note that, in the above description, the stress distribution in the depth direction is measured at one point on the horizontal plane of the measurement object. Alternatively, the stress distribution in the depth direction may be measured at a plurality of positions on the horizontal plane of the measurement object by emitting the measurement light from the light transmitting and receiving unit 5A while the measurement light is shaken in the horizontal direction using a galvanometer mirror or the like.

Second Embodiment

A measuring device according to a second embodiment will be described with reference to FIGS. 7 and 8.

While the measuring device according to the first embodiment uses the plurality of (n) laser light sources $\mathbf{11}_1$ to $\mathbf{11}_n$ that emit laser beams having respective different wavelengths λ1 to λn as the light source 11 in the light emitting unit 1, the measuring device according to the second embodiment uses a broadband white light source as a light source 101 in a light emitting unit 100, and emits light in a wavelength band selected from beams of light in a wavelength band having a plurality of different center wavelengths λ1 to λn from the light emitting unit 100.

Similarly to the measuring device according to the first embodiment, the measuring device according to the second embodiment is a measuring device that measures a birefringence distribution of a material that is a measurement object, and specifically, is a measuring device capable of obtaining a stress distribution present inside the material that is a measurement object by eliminating an influence of a material-induced polarized light phase difference in the material that is a measurement object, or capable of measuring the material-induced polarized light phase difference when there is no stress-induced polarized light phase difference in the material that is a measurement object.

The measuring device according to the second embodiment uses a spectral domain interferometry (Spectral Domain-OCT: SD-OCT) which is a type of polarization sensitive optical interferometry (PS-OCT) using two orthogonal beams of polarized light.

Figure 7:
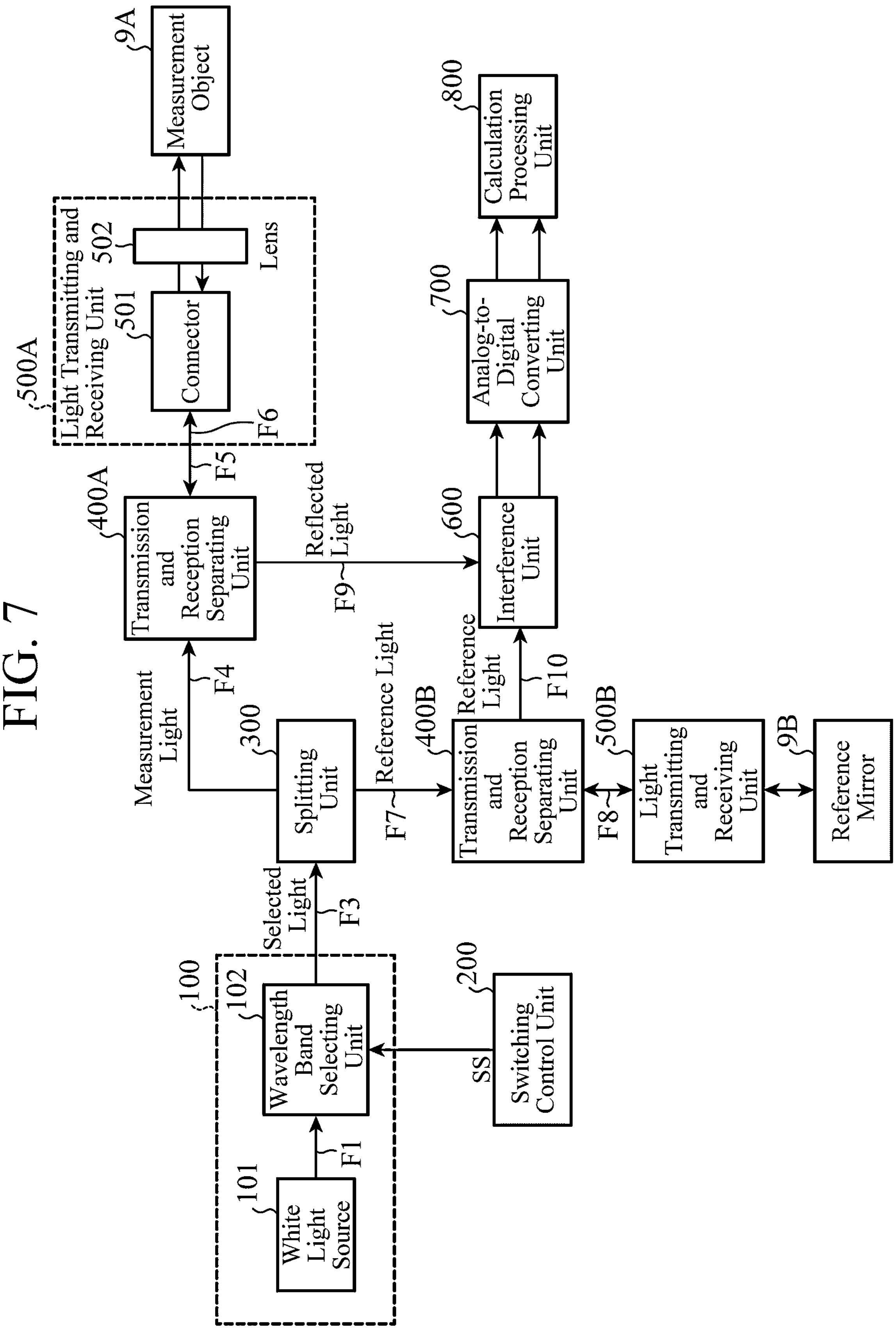
FIG. 7 is a block diagram illustrating a configuration of a main part of a measuring device according to a second embodiment.

As illustrated in FIG. 7, the measuring device according to the second embodiment includes the light emitting unit 100 that is a white light emitting unit, a switching control unit 200, a splitting unit 300, transmission and reception separating units 400A and 400B, light transmitting and receiving units 500A and 500B, an interference unit 600, an A/D converting unit 700, and a calculation processing unit 800.

The light emitting unit 100 selectively and sequentially emits a plurality of beams of light in respective different wavelength bands.

The light emitting unit 100 includes the light source 101 and a wavelength band selecting unit 102.

The light source 101 is a white broadband light source.

The wavelength band selecting unit 102 receives, as an input, white light from the light source 101, receives a switching signal SS from the switching control unit 200, selects one beam of light among the input beams of white light in a plurality of different wavelength bands, and emits the selected beam of light in a wavelength band to the splitting unit 300 as selected light.

The beam of light in the wavelength band selected from the white light has, for example, a first center wavelength λ1 of 405 nm, a second center wavelength λ2 of 435 nm, a third center wavelength λ3 of 510 nm, and a fourth center wavelength λ4 of 635 nm, in which half-value widths Δλ1, Δλ2, Δλ3, and Δλ4 of the center wavelengths are each 10 nm.

The wavelength band selecting unit 102 includes, for example, a first spectral filter in which a wavelength band to be emitted is (λ1±Δλ1), a second spectral filter in which a wavelength band to be emitted is (λ2±Δλ2), a third spectral filter in which a wavelength band to be emitted is (λ3±Δλ3), and a fourth spectral filter in which a wavelength band to be emitted is (λ4±Δλ4), and the first to fourth spectral filters are sequentially and repeatedly selected by the switching signal SS from the switching control unit 200.

The switching signal SS from the switching control unit 200 is a signal that determines a timing at which one spectral filter is sequentially selected from the first to fourth spectral filters.

The splitting unit 300 has a similar configuration to the splitting unit 3 in the measuring device according to the first embodiment, receives, as an input, the selected light from the wavelength band selecting unit 102, splits the selected light into measurement light and reference light at a set power ratio, and emits the measurement light and the reference light.

The transmission and reception separating unit 400A for measurement light has a similar configuration to the transmission and reception separating unit 4A in the measuring device according to the first embodiment, receives, as an input, the measurement light from the splitting unit 300, and transmits the input measurement light to the light transmitting and receiving unit 500A.

The transmission and reception separating unit 400A receives, as an input, reflected light obtained by reflected by a measurement object 9A from the light transmitting and receiving unit 500A, and transmits the input reflected light to the interference unit 600.

The light transmitting and receiving unit 500A has a similar configuration to the light transmitting and receiving unit 5A in the measuring device according to the first embodiment, receives, as an input, the measurement light from the transmission and reception separating unit 400A, and irradiates the measurement object 9A with the input measurement light.

The light transmitting and receiving unit 500A receives reflected light that is light obtained by reflection of the measurement light emitted to the measurement object 9A on the measurement object 9A, and emits the received reflected light to the transmission and reception separating unit 400A.

The transmission and reception separating unit 400B for reference light has a similar configuration to the transmission and reception separating unit 4B in the measuring device according to the first embodiment, receives, as an input, the reference light from the splitting unit 300, and transmits the input reference light to the light transmitting and receiving unit 500B.

The transmission and reception separating unit 400B receives, as an input, reference light reflected by a reference mirror 9B from the light transmitting and receiving unit 500B, and transmits the input reference light to the interference unit 600.

The light transmitting and receiving unit 500B has a similar configuration to the light transmitting and receiving unit 5B in the measuring device according to the first embodiment, receives, as an input, the reference light from the transmission and reception separating unit 400B, and irradiates the reference mirror 9B with the input reference light.

The light transmitting and receiving unit 500B receives reference light that is light obtained by reflection of the reference light emitted to the reference mirror 9B on the reference mirror 9B, and emits the received reference light to the transmission and reception separating unit 400B.

The interference unit 600 receives, as an input, the reference light from the transmission and reception separating unit 400B and the reflected light from the transmission and reception separating unit 400A, and obtains combined light by combining the input reflected light and reference light. The obtained combined light is separated into two orthogonal beams of polarized light, that is, a horizontal polarized light component and a vertical polarized light component, and a horizontal component analog signal and a vertical component analog signal obtained by converting the optical signals into electrical signals are transmitted to the A/D converting unit 700.

The reference light from the transmission and reception separating unit 400B and the reflected light from the transmission and reception separating unit 400A input to the interference unit 600 at this time are based on the light in the wavelength band selected by the wavelength band selecting unit 102.

The combined light obtained by combining the reference light from the transmission and reception separating unit 400B and the reflected light from the transmission and reception separating unit 400A is generally called interference light.

Figure 8:
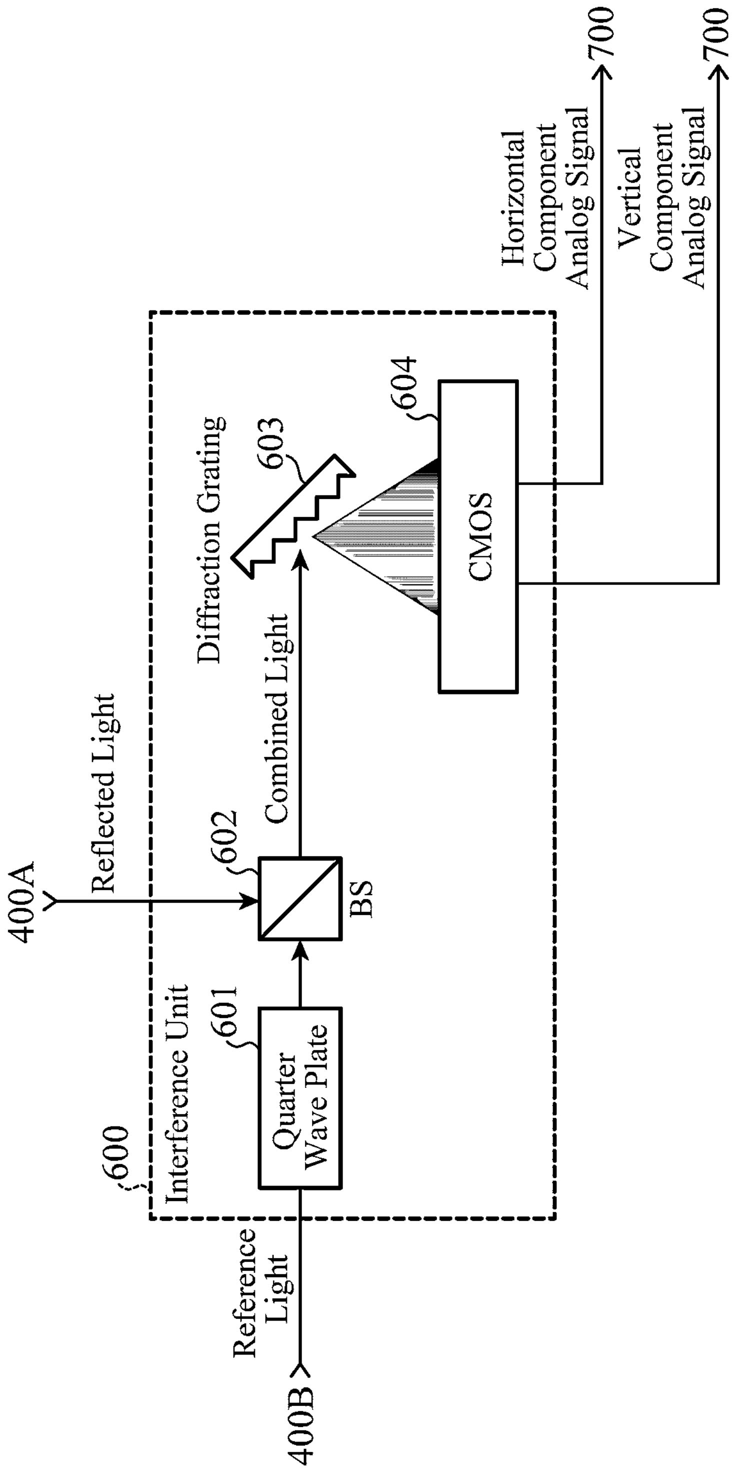
FIG. 8 is a diagram illustrating a configuration of an interference unit in the measuring device according to the second embodiment.

As illustrated in FIG. 8, the interference unit 600 includes a quarter wave plate 601, a beam splitter (BS) 602, a diffraction grating 603, and a two-polarized light component analog signal generating unit 604.

By transmitting linearly polarized light of 45 degrees in the reference light from the transmission and reception separating unit 400B, the quarter wave plate 601 outputs the polarized light as reference light in which a phase difference between a fast axis of the polarized light and a slow axis thereof is shifted by ¼ wavelength.

The beam splitter 602 has a similar configuration to the beam splitter 61 in the measuring device according to first embodiment, receives, as an input, the reference light from the transmission and reception separating unit 400B and the reflected light from the transmission and reception separating unit 400A, combines the input reflected light and reference light, and emits the combined light to the diffraction grating 603.

The diffraction grating 603 generates interference fringes of the combined light from the beam splitter 602 using diffraction and emits the interference fringes to the two-polarized light component analog signal generating unit 604.

The interference fringes are light in which light in the wavelength band selected by the wavelength band selecting unit 102 is emphasized.

The two-polarized light component analog signal generating unit 604 separates combined light corresponding to the light in the wavelength band selected by the wavelength band selecting unit 102 from the diffraction grating 603 into a horizontal polarized light component and a vertical polarized light component, converts an optical signal of the horizontal polarized light component and an optical signal of the vertical polarized light component into electrical signals, and transmits the electrical signals as a horizontal component analog signal and a vertical component analog signal to the A/D converting unit 700.

The two-polarized light component analog signal generating unit 604, for example, separates the light from the diffraction grating 603 into a horizontal polarized light component and a vertical polarized light component by a polarized beam splitter, and converts the optical signals into electrical signals by a complementary metal oxide (CMOS) image sensor.

Note that a polarized light camera using a polarized light filter and a two-dimensional light receiving element such as a CMOS may be used as the two-polarized light component analog signal generating unit 604.

The A/D converting unit 700 has a similar configuration to the A/D converting unit 7 in the measuring device according to first embodiment, converts the horizontal component analog signal and the vertical component analog signal from the interference unit 600 into digital signals, and outputs the digital signals as a horizontal component digital signal and a vertical component digital signal to the calculation processing unit 800.

The calculation processing unit 800 has a similar configuration to the calculation processing unit 8 in the measuring device according to first embodiment, receives, as an input, the horizontal component digital signal and the vertical component digital signal from the A/D converting unit 700, and obtains distance measurement to the measurement object 9A and a retardation R inside the measurement object 9A from the input horizontal component digital signal and vertical component digital signal.

Using the horizontal component digital signal and the vertical component digital signal from the A/D converting unit 700 for each of the plurality of beams of light in respective different wavelength bands, the calculation processing unit 800 obtains a polarized light phase difference δ between two orthogonal beams of polarized light, that is, between the horizontal polarized light component and the vertical polarized light component, and obtains wavelength dependency in the polarized light phase difference δ.

The calculation processing unit 800 obtains a stress distribution of a material that is the measurement object 9A in a depth direction by using a calibration characteristic line in a calibration object for the polarized light phase difference δ with respect to a laser beam in each wavelength band with respect to the measurement object 9A Similarly to the measuring method by the calculation processing unit 8 in the measuring device according to the first embodiment, the measuring method by the calculation processing unit 800 in the measuring device according to the second embodiment is also performed along the measurement sequence illustrated in FIG. 4.

As described above, the measuring device according to the second embodiment calculates an optical path length difference between the reference light and the measurement light by converting the digital electrical signals for the horizontally polarized light and the vertically polarized light from the analog-to-digital converting unit 700 into frequency spectra for each of the plurality of beams of light in different wavelength bands having respective different center wavelengths λ1 to λn emitted from the light emitting unit 1, obtains a polarized light phase difference between the horizontally polarized light and the vertically polarized light for each of the plurality of beams of light having wavelengths λ1 to λn, and obtains wavelength dependency of the polarized light phase difference. Therefore, the measuring device according to the second embodiment has an effect that a stress distribution present inside a material that is the measurement object 9A can be obtained by eliminating an influence of the material-induced polarized light phase difference δorient, or the material-induced polarized light phase difference δorient can be measured when there is no stress-induced polarized light phase difference δstress.

Note that, the measuring device according to the second embodiment selectively and sequentially emits a plurality of beams of white light in respective different wavelength bands from the white broadband light source 101 by the wavelength band selecting unit 102 in the light emitting unit 1, but the light emitting unit 1 may be the white broadband light source 101, and the broadband white light from the white broadband light source 101 may be used for measurement light and reference light by emitting the white light to the splitting unit 300.

In this case, the horizontal component analog signal and the vertical component analog signal for each of the plurality of beams of light having the wavelengths λ1 to λn are obtained by the diffraction grating 603 and the two-polarized light component analog signal generating unit 604 in the interference unit 600.

That is, the combined light based on the white light obtained by combining the reflected light based on the white light and the reference light based on the white light by the beam splitter 602 is split in a space by the diffraction grating 603 for each of wavelength bands having center wavelengths λ1 to λn. The two-polarized light component analog signal generating unit 604 may sequentially and repeatedly select each of the beams of split combined light in the plurality of wavelength bands by the switching signal SS from the switching control unit 200, may separate the selected combined light in a wavelength band into a horizontal polarized light component and a vertical polarized light component, may convert an optical signal of the horizontal polarized light component and an optical signal of the vertical polarized light component into electrical signals, and may transmit the electrical signals as a horizontal component analog signal and a vertical component analog signal to the A/D converting unit 700.

The measuring device configured as described above also has a similar effect to the measuring device according to the second embodiment.

Note that the embodiments can be freely combined to each other, any constituent element in each of the embodiments can be modified, or any constituent element in each of the embodiments can be omitted.

INDUSTRIAL APPLICABILITY

The measuring device according to the present disclosure can be applied to a device that measures an internal stress of a material in a processing device that processes thin PET material, metal, or the like, a device that measures an internal stress of a semiconductor material in a semiconductor inspection device used in a semiconductor mounting step, and a device that measures polarization dependency like a certain type of nerve cell.

REFERENCE SIGNS LIST

1, 100: light emitting unit, 11, 101: light source, $\mathbf{11}_1$ to $\mathbf{11}_3$: first laser light source to third laser light source, 12: wavelength selecting unit, 13: sweep unit, 102: wavelength band selecting unit, 2, 200: switching control unit, 3, 300: splitting unit, 4A, 4B, 400A, 400B: transmission and reception separating unit, 5A, 5B, 500A, 500B: light transmitting and receiving unit, 6, 600: interference unit, 61: beam splitter, 62: polarized beam splitter, 63A: first photoelectric conversion unit, 63B: second photoelectric conversion unit, 601: quarter wave plate, 602: beam splitter, 603: diffraction grating, 604: two-polarized light component analog signal generating unit, 7, 700: A/D converting unit, 8, 800: calculation processing unit, 9A: measurement object, 9B: reference mirror

The invention claimed is:

1. A measuring device comprising:

a light emitter configured to selectively emit each of a plurality of beams of light having respective different wavelength bands;

a splitter configured to split light in a wavelength band selected and emitted by the light emitter into measurement light and reference light, and to emit the measurement light and the reference light;

a light transceiver to irradiate a measurement object with the measurement light from the splitter and to receive reflected light obtained by reflection of the emitted measurement light by the measurement object;

an interferometer configured to combine the reference light with the reflected light from the light transceiver, to separate the combined light into two orthogonal beams of polarized light, to convert the two beams of polarized light into two analog electrical signals, and to output the two analog electrical signals;

an analog-to-digital converter configured to convert the two analog signals from the interferometer into digital electrical signals and to output the digital electrical signals as two digital signals; and calculation processing circuitry configured to convert the digital electrical signals corresponding to the two beams of polarized light from the analog-to-digital converter into frequency spectra for each of the plurality of beams of light emitted from the light emitter, to calculate an optical path length difference between the reference light and the measurement light, to obtain a polarized light phase difference between the two beams of polarized light for each of the plurality of beams of light, and to obtain wavelength dependency of the polarized light phase difference, wherein the light emitter includes:

at least one light source configured to emit a plurality of laser beams having respective wavelengths, a first laser beam among the plurality of laser beams having a first wavelength, a second laser beam among the plurality of laser beams having a second wavelength different from the first wavelength;

a wavelength selector configured to receive, as an input, the plurality of laser beams from the light source to select the first laser beam from the input plurality of laser beams and output the first laser beam; and a sweeper configured to perform a wavelength sweep of the first laser beam selected by the wavelength selector in a corresponding first one of bands and to emit the swept first laser beam as first swept light to the splitter, wherein the measuring device further includes a switching controller configured to transmit a selection signal to the wavelength selector to select another wavelength in response to receiving a signal from the sweeper that the wavelength sweep of the first laser beam is complete, wherein the wavelength selector is further configured to select the second laser beam from the input plurality of laser beams based on the selection signal and output the second laser beam to the sweeper, and the sweeper is configured to perform the wavelength sweep of the second laser beam selected by the wavelength selector in a corresponding second one of bands and to emit the swept second laser beam as second swept light to the splitter.

2. A measuring device comprising:

a laser light emitter to selectively emit each of a plurality of laser beams having respective different wavelength bands;

a splitter to split laser beams in a wavelength band selected and emitted by the laser light emitter into measurement light and reference light, and to emit the measurement light and the reference light;

a light transceiver to irradiate a measurement object with the measurement light from the splitter and to receive reflected light obtained by reflection of the emitted measurement light by the measurement object;

an interferometer to combine the reference light with the reflected light from the light transceiver, to separate the combined light into two orthogonal beams of polarized light, to convert the two beams of polarized light into two analog electrical signals, and to output the two analog electrical signals;

an analog-to-digital converter to convert the two analog signals from the interferometer into digital electrical signals and to output the digital electrical signals as two digital signals; and calculation processing circuitry to convert the digital electrical signals corresponding to the two beams of polarized light from the analog-to-digital converter into frequency spectra for each of the plurality of laser beams emitted from the laser light emitter, to calculate an optical path length difference between the reference light and the measurement light, to obtain a polarized light phase difference between the two beams of polarized light for each of the plurality of laser beams, and to obtain wavelength dependency of the polarized light phase difference, wherein the laser light emitter includes:

at least one light source configured to emit a plurality of laser beams having respective wavelengths, a first laser beam among the plurality of laser beams having a first wavelength, a second laser beam among the plurality of laser beams having a second wavelength different from the first wavelength;

a wavelength selector configured to receive, as an input, the plurality of laser beams from the light source to select the first laser beam from the input plurality of laser beams and output the first laser beam; and a sweeper configured to perform a wavelength sweep of the first laser beam selected by the wavelength selector in a corresponding first one of bands and to emit the swept first laser beam as first swept light to the splitter, wherein the measuring device further includes a switching controller configured to transmit a selection signal to the wavelength selector to select another wavelength in response to receiving a signal from the sweeper that the wavelength sweep of the first laser beam is complete, wherein the wavelength selector is further configured to select the second laser beam from the input plurality of laser beams based on the selection signal and output the second laser beam to the sweeper, and the sweeper is configured to perform the wavelength sweep of the second laser beam selected by the wavelength selector in a corresponding second one of bands and to emit the swept second laser beam as second swept light to the splitter.

3. The measuring device according to claim 1, wherein the calculation processing circuitry calculates one or more Stokes parameters using digital electrical signals corresponding to two beams of polarized light from the analog-to-digital converter;

calculates a distribution of a polarized light phase difference of the measurement object in a depth direction by applying Fourier analysis to the Stokes parameters acquired;

acquires a polarized light phase difference distribution continuous in the depth direction by performing phase connection processing on the distribution of the polarized light phase difference of the measurement object in the depth direction obtained;

calculates a slope of the polarized light phase difference with respect to a wavelength by acquiring a slope distribution of the polarized light phase difference with respect to the wavelength using the polarized light phase difference distribution for all wavelength bands obtained; and acquires a stress distribution in the depth direction by converting the slope of the polarized light phase difference with respect to the wavelength for all the wavelength bands obtained into a stress by referring to a calibration characteristic line in a calibration object.

4. The measuring device according to claim 1, wherein transmission of the reference light from the splitter to the interferometer is performed through a plurality of paths.

5. The measuring device according to claim 1, wherein the splitter and the interferometer are separated and independent from each other.

6. The measuring device according to claim 1, wherein the calculation processing circuitry differentiates the polarized light phase difference by all wavelengths of the wavelength bands, and calculates a slope of the polarized light phase difference to each of the all wavelengths.

* * * * *